(12) United States Patent
Yamazaki et al.

(10) Patent No.: US 8,674,570 B2
(45) Date of Patent: Mar. 18, 2014

(54) DISK DRIVE DEVICE FOR ROTATING A DISK

(71) Applicant: Samsung Electro-Mechanics Japan Advanced Technology Co., Ltd., Shizuoka (JP)

(72) Inventors: Hiroki Yamazaki, Shizuoka (JP); Hiroshi Muramatsu, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

(21) Appl. No.: 13/868,773

(22) Filed: Apr. 23, 2013

(65) Prior Publication Data

US 2013/0234550 A1 Sep. 12, 2013

Related U.S. Application Data

(62) Division of application No. 13/632,868, filed on Oct. 1, 2012, now Pat. No. 8,456,050, which is a division of application No. 12/689,206, filed on Jan. 18, 2010, now Pat. No. 8,278,791.

(30) Foreign Application Priority Data

Mar. 16, 2009 (JP) .................................. 2009-062787

(51) Int. Cl.
*H02K 11/00* (2006.01)
(52) U.S. Cl.
USPC ........................................................... 310/71

(58) Field of Classification Search
USPC .............................................. 310/71, 90, 90.5
See application file for complete search history.

(56) References Cited

U.S. PATENT DOCUMENTS

| | | | | | |
|---|---|---|---|---|---|
| 5,015,893 | A | * | 5/1991 | Shiozawa | .................... 310/67 R |
| 5,333,079 | A | | 7/1994 | Takegami et al. | |
| 5,414,575 | A | | 5/1995 | Katakura | |
| 5,831,355 | A | | 11/1998 | Oku et al. | |
| 5,986,365 | A | * | 11/1999 | Kuwert et al. | .................... 310/51 |
| 6,097,121 | A | | 8/2000 | Oku et al. | |
| 6,429,555 | B1 | | 8/2002 | Stefansky et al. | |

(Continued)

FOREIGN PATENT DOCUMENTS

| | | |
|---|---|---|
| JP | H07-222386 A | 8/1995 |
| JP | 2008-061331 | 3/2008 |

*Primary Examiner* — Nguyen N Hanh
(74) *Attorney, Agent, or Firm* — Blank Rome

(57) ABSTRACT

In the brushless motor, a magnetic recording disk is to be mounted on a hub. A base plate rotatably supports the hub on the upper surface. A laminated core is fixed on the upper surface of the base plate and has a ring portion and a plurality of teeth that extend radially from the ring portion. Coils are wound around the plurality of teeth. A cylindrical magnet is fixed to the hub and is magnetized for driving with a plurality of poles along the circumferential direction and is arranged to radially face the plurality of teeth of the laminated core. A wire of one end of one of the coils is drawn out to the bottom surface of the base plate through a hole arranged on the base plate. The wire is connected to a driving line for supplying a current to the coils at a position other than the position of the hole on the base plate. The hole of the base plate is plugged with a resin.

20 Claims, 7 Drawing Sheets

(56) References Cited

U.S. PATENT DOCUMENTS

| | | |
|---|---|---|
| 7,254,882 B2 | 8/2007 | Ito et al. |
| 8,120,217 B2 | 2/2012 | Tawata et al. |
| 8,278,791 B2 | 10/2012 | Yamazaki et al. |
| 2005/0206255 A1 | 9/2005 | Yoshino |
| 2008/0218010 A1 | 9/2008 | Hino et al. |
| 2009/0195095 A1 | 8/2009 | Yawata et al. |

* cited by examiner 300 (RELATED ART)

(RELATED ART)

600

DISK DRIVE DEVICE FOR ROTATING A DISK

CROSS-REFERENCES TO RELATED APPLICATIONS

This application is a divisional of application Ser. No. 13/632,868, filed on Oct. 1, 2012, which is a divisional of application Ser. No. 12/689,206, filed on Jan. 18, 2010, U.S. Pat. No. 8,278,791, issued Oct. 2, 2012 which claims priority from JP2009-062787, filed on Mar. 16, 2009, incorporated by reference in their entirety.

BACKGROUND OF THE INVENTION

1. Field of the Invention

The present invention relates to a disk drive device for rotating a disk.

2. Description of the Related Art

A hard disk drive is known as a medium used as a storage device in a computer. In a hard disk drive, a magnetic recording disk on which recording tracks are formed is rotated at high speed by a brushless motor disclosed in Japanese Patent Application Publication No. 2008-61331. A magnetic head is placed against the surface of the magnetic recording disk with a slight distance between them for the purpose of reading/writing magnetic data contained in the recording tracks.

In recent years, Magneto-resistive elements (hereinafter referred to as "MR elements") are widely used for magnetic heads since they are advantageous in terms of realizing a higher density. It is known that Thermal Asperity failure (hereinafter referred to as TA failure) may occur with regard to these MR elements.

TA failure is a failure in which the resistance value of the MR element changes instantaneously due to the instantaneous cooling or heating of the MR element, and the change in the resistance value of the MR element appears as noise in the read-out signal. One of the reasons for the instantaneous heating is that fine particles collide with the MR element while the magnetic head traces the recording track. The MR element is heated instantaneously due to the energy of the collision.

The term "particles" refers to, for example, dust in the air, shaved particles from a surface of a component, pieces of a whetstone, or oils-and-fats.

SUMMARY OF THE INVENTION

Research by the present inventors indicates that TA failure may occur because particles of a size of 0.1 μm to only a few micrometers floating in the air stick to the surface of the magnetic recording disk.

Generally, the region of a hard disk drive in which the magnetic recording disk is placed is sealed after it is filled with clean air that is produced by removing particles, etc. However, if, for example, a leak occurs at a drawing-out hole for a wire of a coil arranged on the base plate, particles outside may enter in the region on the magnetic recording disk's side, and this may cause a TA failure.

A similar issue may be present in the other types of the disk drive devices.

The present invention addresses these disadvantages, and a general purpose of one embodiment of the present invention is to provide a disk drive device that reduces the leak from the drawing-out hole for the wire of the coil arranged on the base plate.

An embodiment of the present invention relates to a disk drive device. This disk drive device comprises: a hub on which a recording disk is to be mounted; a base rotatably supporting the hub on one surface of the base through a bearing unit; a core fixed onto said surface of the base, the core having a ring portion and a plurality of teeth that extend radially from the ring portion; coils wound around the plurality of teeth; and a magnet fixed to the hub, the magnet being magnetized for driving with a plurality of poles along the circumferential direction and arranged to radially face the plurality of teeth. A wire at one end of one of the coils is drawn out to the other surface of the base through a hole arranged on the base. The wire is connected to a driving line for supplying a current to the coils at a position other than the position of the hole arranged on the base. The hole arranged on the base is plugged with a resin.

The term "disk drive device" may refer to a device for driving a recording disk or, more specifically, a brushless motor.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

Figure 1A:
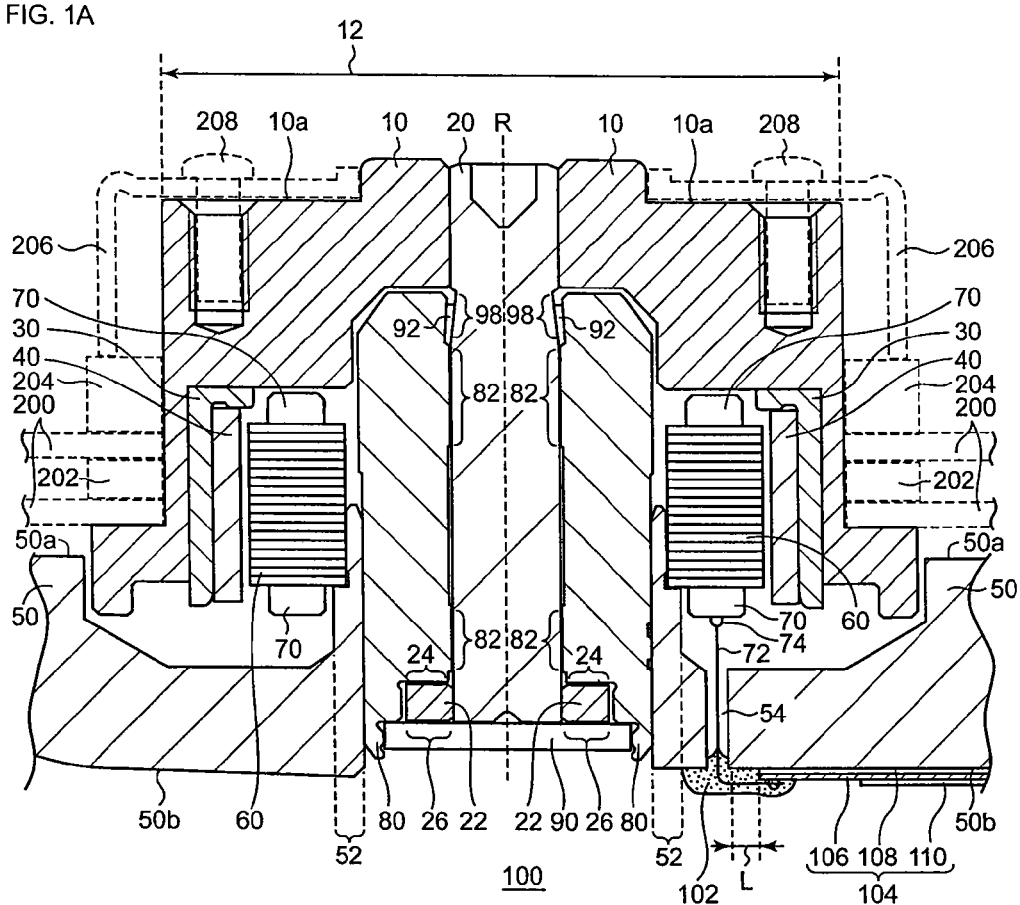
FIG. 1A is a cross-sectional view of the brushless motor according to the first embodiment of the present invention.

The invention will now be described by reference to the preferred embodiments. This does not intend to limit the scope of the present invention but to exemplify the invention.

The size of the components in each figure may be changed in order to aid understanding. Some of the components in each figure may be omitted if they are not important for explanation.

Preferably, an embodiment of the present invention is used for a brushless motor that is installed in a hard disk drive and that drives a magnetic recording disk, in particular, for a brushless motor of a hard disk drive using the MR element for the magnetic head.

The First Embodiment

In the brushless motor 100 according to the first embodiment of the present invention, a wire 72 of one end of a coil 70 is drawn out to a bottom surface 50b of a base plate 50 through a hole 54 arranged on the base plate 50. The wire 72 of said end of the coil 70 is connected to a driving line or driving wiring 106 at a position other than the position of or on or above the hole 54. Further, in the brushless motor 100, the hole 54 is plugged with a resin 102 in order to keep it airtight. As a result, electrically connecting the driving line 106 and the wire 72 can be performed independently from sealing the hole 54 of the base plate 50, thereby the reliability of each act can be increased.

Figure 1B:
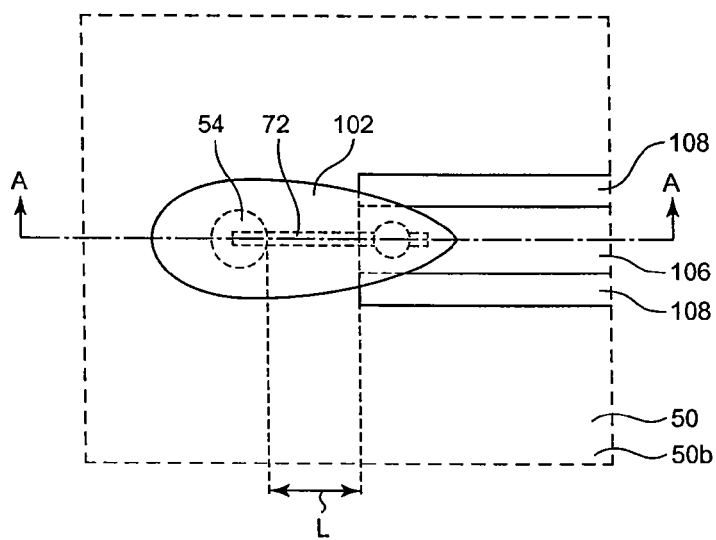
FIG. 1B is a partial bottom view of the brushless motor according to the first embodiment of the present invention.

FIG. 1A is a cross-sectional view of the brushless motor 100 according to the first embodiment of the present invention. FIG. 1B is a partial bottom view of the brushless motor 100 according to the first embodiment of the present invention. FIG. 1B is a bottom view of the brushless motor 100 according to the first embodiment of the present invention near the hole 54 of the base plate 50. FIG. 1A is the view that is sectioned along the line A-A, as illustrated in FIG. 1B.

The brushless motor 100 is installed in a hard disk drive and rotates two magnetic recording disks 200. The brushless motor 100 comprises a substantially cup-shaped hub 10, a shaft 20, a flange 22, a yoke 30, a cylindrical magnet 40, a base plate 50, a laminated core 60, coils 70, a sleeve 80, a plate 90, lubricant 92, a resin 102, and a Flexible Printed Circuit (FPC) 104. Hereinafter, it is assumed that the side of the base plate 50 on which the hub 10 is installed is the "upper" side.

The side of the base plate 50 at the upper surface 50a (i.e., the side on which the magnetic recording disk 200 is placed) is filled with clean air that is produced by removing particles, etc. The chassis of the hard disk drive on which the brushless motor 100 is installed is formed so that the side of the base plate 50 at the upper surface 50a is sealed.

The hub 10, the shaft 20, the flange 22, the yoke 30, and the cylindrical magnet 40 form a rotor, and these components rotate as a unit around the rotational axis R of the motor when the brushless motor 100 rotates. One end of the shaft 20 is fixed in a hole located at the center of the hub 10 by using both press-fit and glue. The flange 22 is press-fit against the other end of the shaft 20.

A cylindrical portion 12 of the hub 10, which has the shape of sticking out upward, is fit into the central holes of the two magnetic recording disks 200. A ring-shaped first spacer 202 is inserted between the two magnetic recording disks 200. A clamper 206 presses the two magnetic recording disks 200 and the first spacer 202 against the hub 10 via a ring-shaped second spacer 204 in order to fix them together. The clamper 206 is affixed to the top surface 10a of the hub 10 by a plurality of clamping screws 208.

The yoke 30 has a reverse L-shaped cross section and is made of a magnetic material such as iron. The yoke 30 is press-fit against the lower surface of the hub 10. The cylindrical magnet 40 is glued onto the inner surface of the yoke 30. The cylindrical magnet 40 is made of a rare-earth material such as Neodymium, Iron, or Boron. The cylindrical magnet 40 faces radially towards twelve teeth of the laminated core 60. The cylindrical magnet 40 is magnetized for driving with eight poles along the circumferential direction. The surface of the cylindrical magnet 40 is treated for preventing rusting by electro deposition coating or spray coating.

The base plate 50, the laminated core 60, the coils 70, the sleeve 80, and the plate 90 form a stator. The stator rotatably supports the rotor when the brushless motor 100 rotates. The base plate 50 is a part of the base of the hard disk drive. The base plate 50 has a cylindrical portion 52 of which the center is the rotational axis R of the motor. The sleeve 80 is glued onto the inner surface of the cylindrical portion 52. The sleeve 80 accommodates the shaft 20. The plate 90 is glued onto the flange 22 side surface of the sleeve 80.

It is to be noted that the base plate 50 may be made separately from the base of the hard disk drive.

The base plate 50 is produced by at least the following two steps: 1) die-casting an alloy of aluminum into a form of the base plate 50; and 2) forming a film for insulation (hereinafter referred to as an insulating film) on at least a part of the surface. It is preferred in light of the thinness and the film strength that the insulating film is formed by cation electrodeposition coating of an epoxy resin.

The lubricant 92 is injected in a region in between part of the rotor (the shaft 20 and the flange 22) and part of the stator (the sleeve 80 and the plate 90). The shaft 20, the flange 22, the lubricant 92, the sleeve 80, and the plate 90 constitute a bearing unit that rotatably supports the hub 10. The base plate 50 rotatably supports the hub 10 through the bearing unit on the upper surface 50a.

A pair of herringbone-shaped radial dynamic pressure grooves 82 that are vertically separated from each other are formed on the inner surface of the sleeve 80. A first herringbone-shaped thrust dynamic pressure groove 24 is formed on the upper surface of the flange 22. A second herringbone-shaped thrust dynamic pressure groove 26 is formed on the lower surface of the flange 22. The rotor is axially and radially supported by the dynamic pressure generated in the lubricant 92 by these dynamic pressure grooves when the brushless motor 100 rotates.

A capillary seal 98, where the gap between the inner surface of the sleeve 80 and the outer surface of the shaft 20 gradually increases upward, is formed on the opening side of the sleeve 80. The capillary seal 98 prevents the leakage of the lubricant 92 with the capillary effect.

The laminated core 60 has a ring portion and twelve teeth that extend out radially from the ring portion. The laminated core 60 is formed by laminating eighteen thin electro-magnetic steel plates and mechanically integrating them. An insulation coating is applied on the surface of the laminated core 60 by electro deposition coating or powder coating. Each of the coils 70 is wound around one of the twelve teeth, respectively. A driving flux is generated along the teeth by applying a three-phase sinusoidal driving current through the coils 70. The inner surface of the ring portion of the laminated core 60 is fitted to the outer surface of the cylindrical portion 52 with press-fit or clearance fit and glued thereon.

The coils 70 are formed by winding a wire by a necessary number of times around each tooth of the laminated core 60. The wire starts to be wound around a tooth from under the tooth. Then, the wire is subsequently wound around the next tooth above the tooth, the next tooth belonging to the same electrical phase, in three-phase driving, as that of the previous tooth. The wire at the end of the winding process is drawn out onto the lower side of the teeth. In doing so, a middle section of the wire at the end of winding process is glued onto one tooth with glue 74. This may prevent the wire at the end of winding process from becoming disheveled. It is less possible for the wire at the end of winding process to be cut due to resonant vibration in the case where the brushless motor 100 is cleaned by ultrasonic cleaning.

The wire (hereinafter referred to as a wire 72 of one end of the coil 70) at the end of the winding that is drawn out, as above, is drawn out to the side of the base plate 50 at the bottom surface 50b through the hole 54 arranged on the base plate 50. The wire 72 of one end of the coil 70 is bent above the hole 54 and is connected to the driving line 106 of the FPC 104 that is put on the bottom surface 50b of the base plate 50. One end of the FPC 104 to which end the wire 72 is connected is located at a predetermined distance L away from the edge of the hole 54. The predetermined distance L is determined by experiment.

FPC 104 has a structure that is formed by laminating, in order, a strip-shaped insulation film 108, a strip-shaped driving line 106, and a protecting film 110. The insulation film 108 is put on the bottom surface 50b of the base plate 50 by a double-stick tape. The driving line 106 is insulated against the bottom surface 50b of the base plate 50 by the insulation film 108. The protecting film 110 is peeled off and the driving line 106 is exposed to the outside at the portion of the FPC 104 that is close to the hole 54. The driving line 106 supplies the driving current to the coils 70 from a driving circuit (not shown in the figures).

A liquid-like resin 102 is injected into the hole 54 of the base plate 50 and cured in order to keep the airtight quality of the side of the base plate 50 at the upper surface 50a where it is filled with clean air. The resin 102 is filled in the hole 54 so that it closes the hole 54. The resin 102 is applied so that the resin 102 covers the connection between the driving line 106 and the wire 72 of said end of the coil 70. As a result, the connection and the section of the wire 72 on the bottom surface 50b of the base plate 50 can be protected and insulated from the outside by the resin 102.

The resin 102 used here is a resin whose main ingredient is a resin that is cured using both ultraviolet irradiation and heating, such as an epoxy-acrylic-hybrid resin.

The wire 72 of said end of the coil 70 is welded to the driving line 106. This welding is performed by pressing the wire 72 of said end of the coil 70 against the driving line 106 and by heating under the pressure. This enables one to connect the wire 72 to the driving line 106 without soldering.

It is common in the case of soldering to apply flux to the portion to be soldered. If the flux is not removed after soldering, the remaining flux may cause rust. Therefore, the remaining flux should be cleaned up after soldering. However, the space where the flux used to be before cleaning becomes empty after cleaning. The space may cause a leak from outside to the side of the base plate 50 at the upper surface 50a. In the present embodiment, such an issue does not occur since it does not use soldering or a flux.

The operation of the brushless motor 100 as described above shall be described below. The three-phase driving current is supplied to the coils 70 through the driving line 106 to rotate the brushless motor 100. The driving fluxes are generated along the twelve teeth by making the driving current flow through the coils 70. These driving fluxes give torque to the cylindrical magnet 40, and the whole rotor rotates.

Figure 2A:
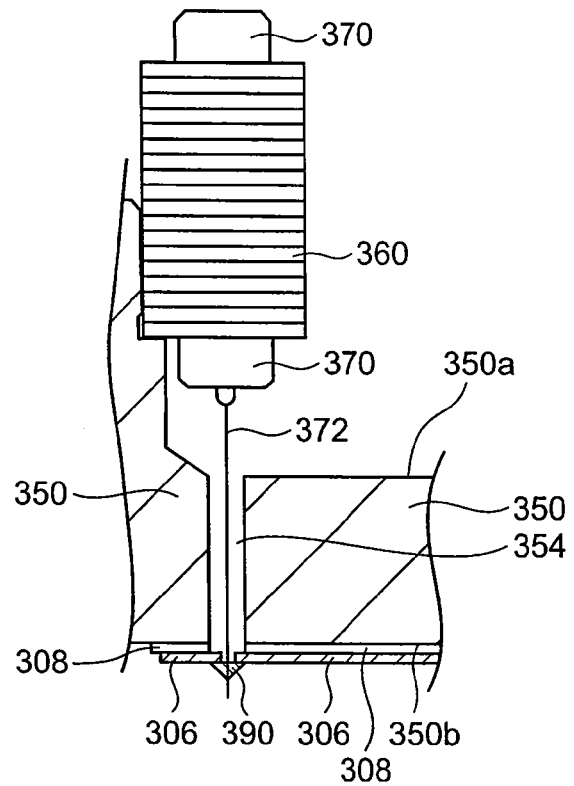
FIG. 2A is a partial cross-sectional view of the brushless motor according to the related art.
Figure 2B:
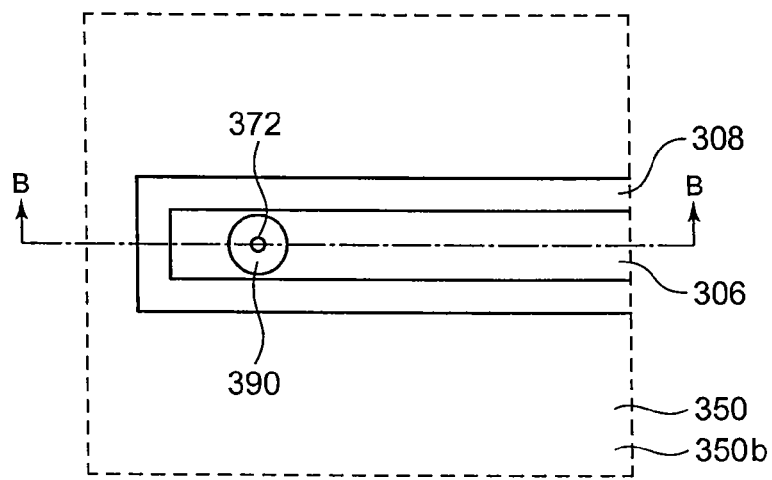
FIG. 2B is a partial bottom view of the brushless motor according to the related art.

Described below is the related art in which the hole of the base plate is closed by soldering without using the resin 102. FIG. 2A is a partial cross-sectional view of the brushless motor 300 according to the related art. FIG. 2B is a partial bottom view of the brushless motor 300 according to the related art. FIG. 2A is a partial cross-sectional view of the brushless motor 300 near the hole 354 arranged on the base plate 350. FIG. 2B is a bottom view of the brushless motor 300 near the hole 354 of the base plate 350. FIG. 2A is the view that is sectioned along the line B-B, as illustrated in FIG. 2B.

The description will be omitted with regard to the portion(s) of the brushless motor 300 that is/are not shown in FIG. 2A or FIG. 2B since the portion(s) has/have a structure similar to that/those of the brushless motor 100 according to the first embodiment of the present invention.

A wire 372 of one end of a coil 370, which is wound around a tooth of a laminated core 360, is drawn out from an upper surface 350a of a base plate 350 to a bottom surface 350b through a hole 354 of the base plate 350. An insulation film 308 and a driving line 306 are arranged on the bottom surface 350b of the base plate 350 so that they cover the hole 354. A hole in communication with the hole 354 is arranged on each the driving line 306 and the insulation film 308. The wire 372 is drawn out to the bottom surface 350b of the base plate 350 through the hole of the driving line 306 and the hole of the insulation film 308. The driving line 306 and the wire 372 are electrically connected to each other by soldering. In addition, in order to keep the airtight quality of the side of the base plate 350 at the upper surface 350a, soldering is performed so that the solder 390 closes up the opening between the wire 372 and the hole arranged on the driving line 306. In the process of soldering, a flux is used. The flux sticks to the driving line 306, the wire 372, and/or the edge of the hole 354. The flux is cleaned up after soldering.

Tiny spaces are created after cleaning up the flux. These tiny spaces may cause a leak from outside to the side of the base plate 350 at the upper surface 350a. There also is a possibility that a leak may occur where the insulation film 308 and the base plate 350 are connected or between the insulation film 308 and the driving line 306. If such a leak occurs, particles may enter in the side of the base plate 350 at the upper surface 350a from the outside, thereby deteriorating the cleanness of the air.

In the brushless motor 100 according to the present embodiment, the wire 72 of said end of the coil 70 is connected to the driving line 106 at a position other than the position of the hole 54 on the base plate 50. Furthermore, the hole 54 is plugged with the resin 102. Therefore, electrically connecting the driving line 106 and the wire 72 can be performed independently from sealing the hole 54 of the base plate 50, thereby the reliability of each act can be increased. In particular, since the hole 54 is physically separated from the welding connection between the wire 72 and the driving line 106 when the resin 102 is injected into the hole 54 of the base plate 50, it is less possible for such a leak to occur, as it has in the related art, and the reliability of the airtight quality can be increased. As a result, it is possible to keep the cleanness of the air (i.e., fewer particles) on the side of the base plate 50 at the upper surface 50a, thereby suppressing TA failure.

In the brushless motor 100 according to the present embodiment, the wire 72 of one end of the coil 70 is bent after being drawn out to the bottom surface 50b of the base plate 50. This contributes to the thinning of the thickness of the resin 102. In addition, it is less likely for the wire 72 to be cut even if the brushless motor 100 thermally expands.

In the case where a liquid-like thermosetting resin of lower viscosity is used for plugging the hole 54 of the base plate 50, in the process of manufacturing the brushless motor, the resin may flow and spread out during the transportation of the brushless motor into a heating furnace after the resin is injected into the hole 54. In this case, the hole 54 may not be completely sealed. If one uses a resin of higher viscosity in order to avoid this, it takes a longer time to fill the hole 54, and the work efficiency may be reduced. In the brushless motor 100 according to the present embodiment, the hole 54 of the base plate 50 is plugged with the resin that is cured using both ultraviolet irradiation and heating. In this case, in the process of manufacturing the brushless motor, the resin is injected into the hole 54, and the resin also is applied to the welded connection between the wire 72 and the driving line 106. Immediately after that, an ultraviolet light is irradiated on the resin, thereby curing the surface of the resin. This may make it less likely that the resin spreads out during transportation into the heating furnace. The brushless motor is properly heated after it is transported into the heating furnace, and the resin including its inside is cured. In the case where a liquid-like resin of lower viscosity is selected to be used among resins that are cured using both ultraviolet irradiation and heating in particular, the resin can be smoothly injected in the hole 54 within a short period of time, thereby increasing the work efficiency. Furthermore, the resin is cured to its inside by heating. This may suppress the evaporation of ingredients of the resin and may reduce the contamination of the air on the side of the base plate 50 at the upper surface 50a. As a result, TA failure may be suppressed.

Preferably, the resin whose main ingredient is the epoxy-acrylic-hybrid resin is used as the resin that is cured using both ultraviolet irradiation and heating in the brushless motor 100 according to the present embodiment, since the surface of the resin can be cured with the irradiation of the ultraviolet light of wavelengths of 200-400 nm within a short period of time.

Preferably, the viscosity of the resin 102 before being cured at 25 Celsius degrees is in the range between 4 (Pa·s) and 16 (Pa·s). By having the viscosity greater than 4 (Pa·s), the unnecessary spread-out of the resin 102 can be suppressed. By having the viscosity smaller than 16 (Pa·s), the time it takes to plug up the hole 54 can sufficiently be shortened.

In the brushless motor 100 according to the present embodiment, the insulating film is formed on at least part of the surface of the base plate 50. In the case where a base plate is manufactured at least through a process of die-casting the alloy of aluminum, it is known that a number of tiny concave portions are formed on the surface of the base plate. If impurities, such as fine particles, stick to the tiny concave portions, those impurities may be released to the magnetic-recording-disk side of the base plate and may cause TA failure. In the present embodiment, the insulation film is formed on the surface of the base plate 50. As a result, the amount of impurities, such as particles, emitted from the tiny concave portions can be reduced.

Preferably, the insulation film is formed on the upper surface 50a of the base plate 50 in terms of keeping the cleanness of the air on the side of the base plate 50 at the upper surface 50a.

The Second Embodiment

The main difference between the brushless motor 400 according to the second embodiment and the brushless motor 100 according to the first embodiment resides in the shape of the insulation film.

Figure 3A:
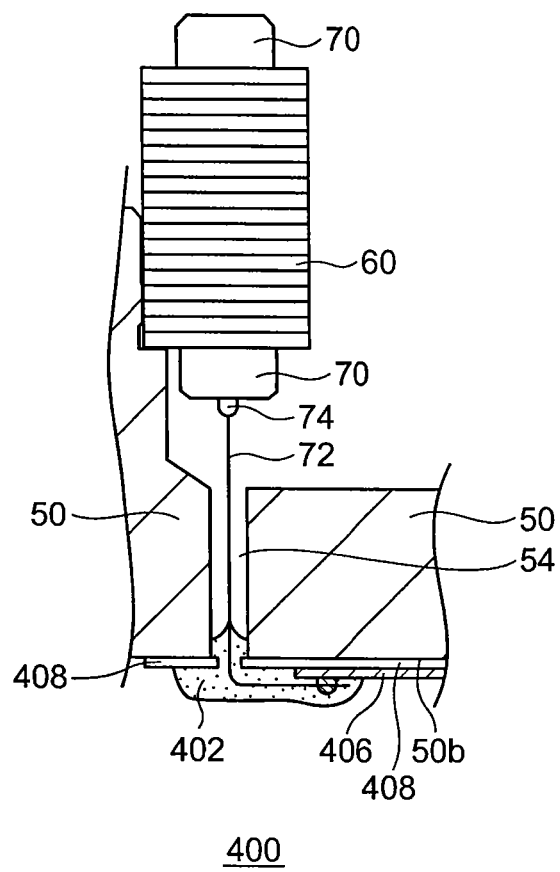
FIG. 3A is a partial cross-sectional view of the brushless motor according to the second embodiment of the present invention.
Figure 3B:
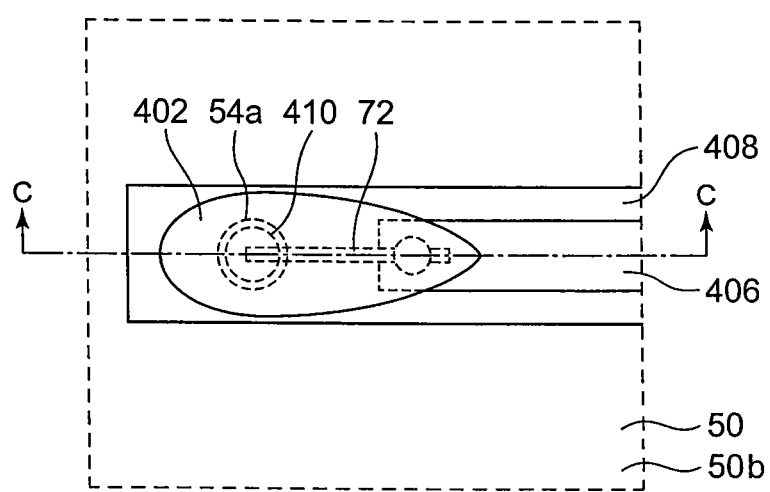
FIG. 3B is a partial bottom view of the brushless motor according to the second embodiment of the present invention.

FIG. 3A is a partial cross-sectional view of the brushless motor 400 according to the second embodiment. FIG. 3B is a partial bottom view of the brushless motor 400 according to the second embodiment. FIG. 3A is a partial cross-sectional view of the brushless motor 400 near the hole 54 arranged on the base plate 50. FIG. 3B is a bottom view near the hole 54 of the base plate 50. FIG. 3A is the view that is sectioned along the line C-C, as illustrated in FIG. 3B.

The description will be omitted with regard to the portion(s) of the brushless motor 400 that is/are not shown in FIG. 3A or FIG. 3B since the portion(s) has/have a structure similar to that/those of the brushless motor 100 according to the first embodiment of the present invention.

The insulation film 408 is extended so that it covers the hole 54 of the base plate 50. A hole 410 in communication with the hole 54 is arranged on the insulation film 408. The wire 72 of said end of the coil 70 is drawn out to the side of the base plate 50 at the bottom surface 50b through the hole 410 of the insulation film 408.

The hole 410 of the insulation film 408 is formed so that the hole 410 is concentric with the hole 54 of the base plate 50. The diameter of the hole 410 of the insulation film 408 is smaller than the diameter of the hole 54 of the base plate 50. Therefore, the hole 410 of the insulation film 408 does not overlap with the edge 54a of the hole 54 of the base plate 50, the edge 54a being on the side at the bottom surface 50b. This enables one to position the wire 72 inside the hole 54 of the base plate 50 so that the wire 72 does not touch the wall of the hole 54. As a result, a short circuit is less likely to occur between the wire 72 and the base plate 50.

A liquid-like resin 402 is injected into the hole 54 of the base plate 50 and cured in order to keep the airtight quality of the side of the base plate 50 at the upper surface 50a where it is filled with clean air. The resin 402 is applied so that the resin 402 covers the welded connection between the driving line 406 and the wire 72 of said end of the coil 70.

In the brushless motor 400 according to the present embodiment, the hole 410 in communication with the hole 54 is arranged on the insulation film 408. Therefore, the reliability of the insulation between the wire 72 and the bottom surface 50b of the base plate 50 can be increased.

Since the edge 54a on the side of the base plate 50 at the bottom surface 50b is sharp, a short circuit is more likely to occur between the wire 72 and the base plate 50 if the wire 72 touches the edge 54a. In the brushless motor 400 according to the present embodiment, the edge 54a on the side of the base plate 50 at the bottom surface 50b is covered by the insulation film 408. As a result, a short circuit there can be prevented.

The Third Embodiment

The main difference between the brushless motor 500 according to the third embodiment and the brushless motor 100 according to the first embodiment resides in the shape of the insulation film.

Figure 4A:
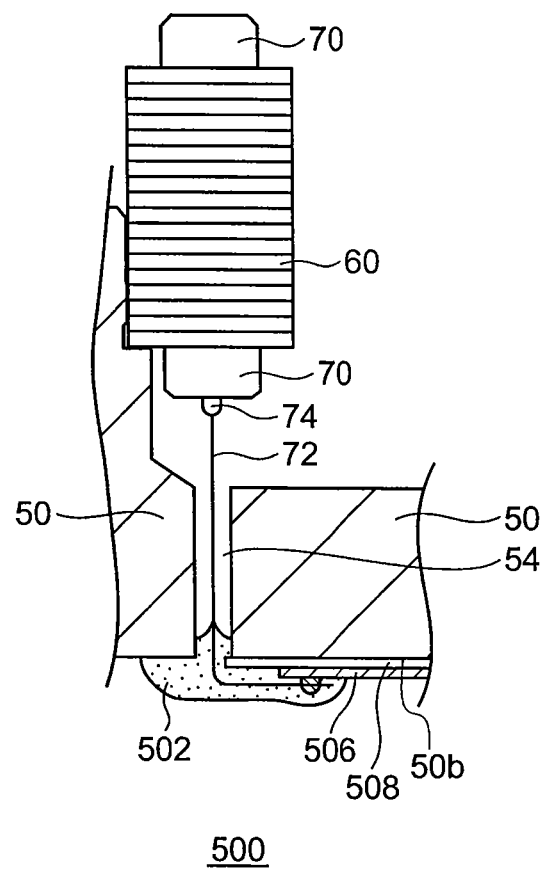
FIG. 4A is a partial cross-sectional view of the brushless motor according to the third embodiment of the present invention.
Figure 4B:
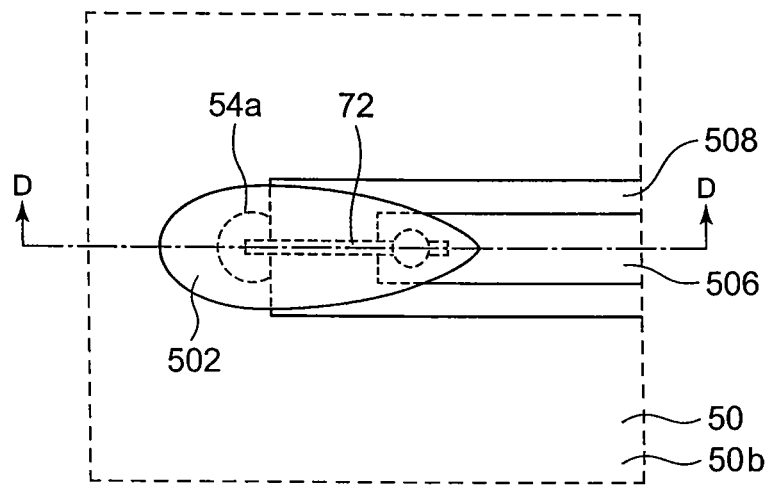
FIG. 4B is a partial bottom view of the brushless motor according to the third embodiment of the present invention.

FIG. 4A is a partial cross-sectional view of the brushless motor 500 according to the third embodiment. FIG. 4B is a partial bottom view of the brushless motor 500 according to the third embodiment. FIG. 4A is a partial cross-sectional view of the brushless motor 500 near the hole 54 arranged on the base plate 50. FIG. 4B is a bottom view near the hole 54 of the base plate 50. FIG. 4A is the view that is sectioned along the line D-D, as illustrated in FIG. 4B.

The description will be omitted with regard to the portion(s) of the brushless motor 500 that is/are not shown in FIG. 4A or FIG. 4B since the portion(s) has/have a structure similar to that/those of the brushless motor 100 according to the first embodiment of the present invention.

With regard to the edge 54a of the hole 54 of the base plate 50 on the side at the bottom surface 50b, the insulation film 508 covers a portion of the edge 54a, the portion being on the side closer to the welded connection between the driving line 506 and the wire 72 of said end of the coil 70. Preferably, the insulation film 508 covers about 30 percent of the edge 54a in order to easily position the wire 72 inside the hole 54 of the base plate 50.

A liquid-like resin 502 is injected into the hole 54 of the base plate 50 and cured in order to keep the airtight quality of the side of the base plate 50 at the upper surface 50a where it is filled with clean air. The resin 502 is applied so that the resin 502 covers the welded connection between the driving line 506 and the wire 72 of said end of the coil 70.

Since the edge 54a on the side of the base plate 50 at the bottom surface 50b is sharp, a short circuit is more likely to occur between the wire 72 and the base plate 50 if the wire 72 touches the edge 54a. In the brushless motor 500 according to the present embodiment, the insulation film 508 covers a portion of the edge 54a, the portion being on the side closer to the welded connection between the driving line 506 and the wire 72. As a result, a short circuit at the edge 54a can be prevented.

The Fourth Embodiment

The main difference between the brushless motor 600 according to the fourth embodiment and the brushless motor 400 according to the second embodiment resides in the shape of the driving line.

Figure 5A:
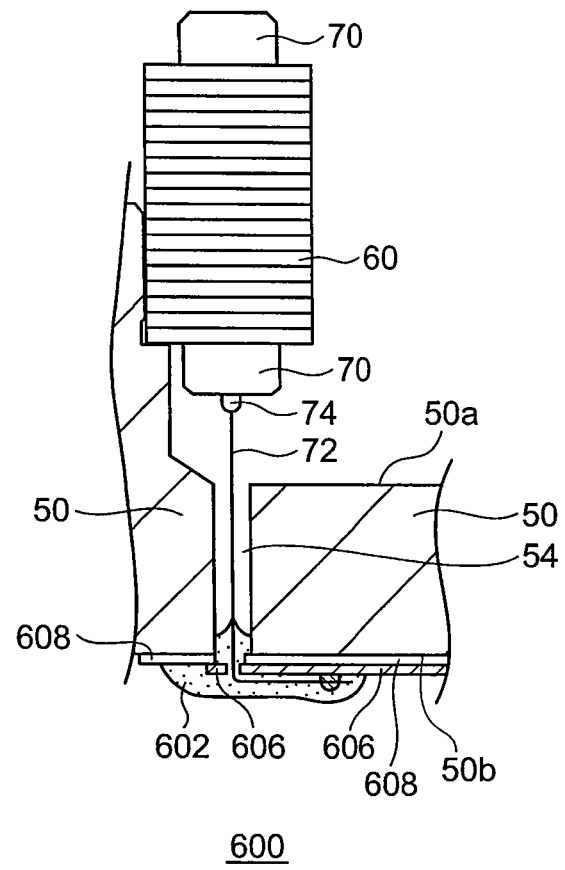
FIG. 5A is a partial cross-sectional view of the brushless motor according to the fourth embodiment of the present invention.
Figure 5B:
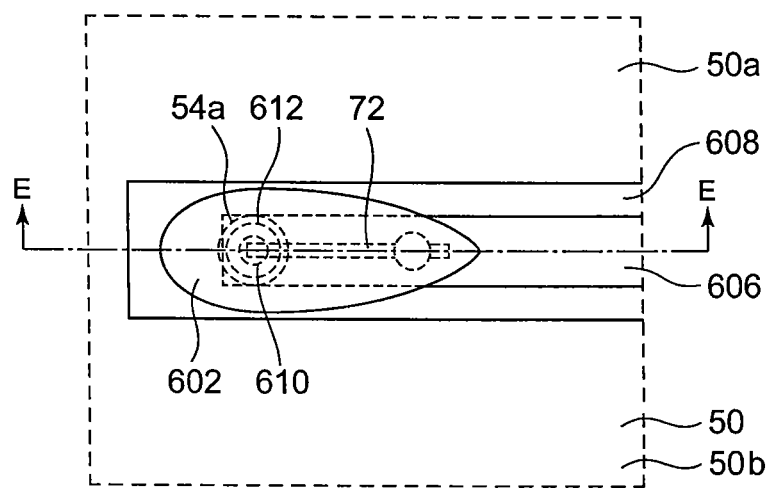
FIG. 5B is a partial bottom view of the brushless motor according to the fourth embodiment of the present invention.

FIG. 5A is a partial cross-sectional view of the brushless motor 600 according to the fourth embodiment. FIG. 5B is a partial bottom view of the brushless motor 600 according to the fourth embodiment. FIG. 5A is a partial cross-sectional view of the brushless motor 600 near the hole 54 arranged on the base plate 50. FIG. 5B is a bottom view near the hole 54 of the base plate 50. FIG. 5A is the view that is sectioned along the line E-E, as illustrated in FIG. 5B.

The description will be omitted with regard to the portion(s) of the brushless motor 600 that is/are not shown in FIG. 5A or FIG. 5B since the portion(s) has/have a structure similar to that/those of the brushless motor 400 according to the second embodiment of the present invention.

The driving line 606 is extended so that it covers the hole 54 of the base plate 50. A hole 610 in communication with the hole 54 is arranged on the driving line 606. The hole 610 of the driving line 606 is formed so that the hole 610 is concentric with the hole 612, the hole 612 being arranged on the insulation film 608 in a manner similar to that described in the second embodiment. The diameter of the hole 610 of the driving line 606 is smaller than the diameter of the hole 612 on the insulation film 608. Therefore, the hole 610 of the driving line 606 does not overlap with the edge 54a of the hole 54 of the base plate 50, the edge 54a being on the side at the bottom surface 50b.

The wire 72 of said end of the coil 70 is drawn out to the side of the base plate 50 at the bottom surface 50b through the hole 612 of the insulation film 608 and the hole 610 of the driving line 606.

A liquid-like resin 602 is injected into the hole 54 of the base plate 50 and cured in order to keep the airtight quality of the side of the base plate 50 at the upper surface 50a where it is filled with clean air. The resin 602 is applied so that the resin 602 covers the welded connection between the driving line 606 and the wire 72 of said end of the coil 70.

In the brushless motor 600 according to the present embodiment, the wire 72 is positioned inside the hole 54 of the base plate 50 so that the wire 72 does not touch the wall of the hole 54. As a result, a short circuit is less likely to occur between the wire 72 and the base plate 50.

The Fifth Embodiment

The main difference between the brushless motor 700 according to the fifth embodiment and the brushless motor 600 according to the fourth embodiment resides in the shape of the base plate.

Figure 6A:
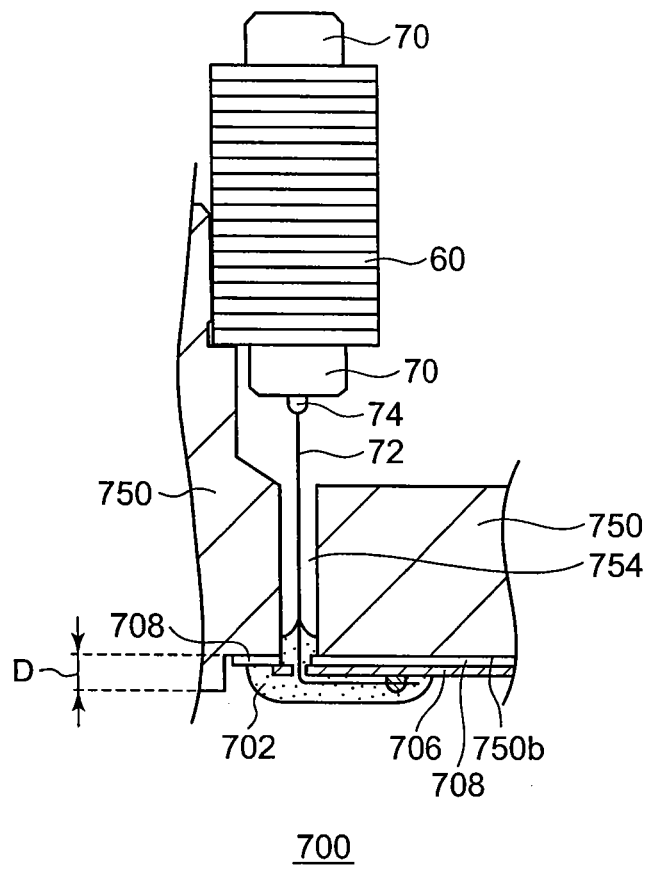
FIG. 6A is a partial cross-sectional view of the brushless motor according to the fifth embodiment of the present invention.
Figure 6B:
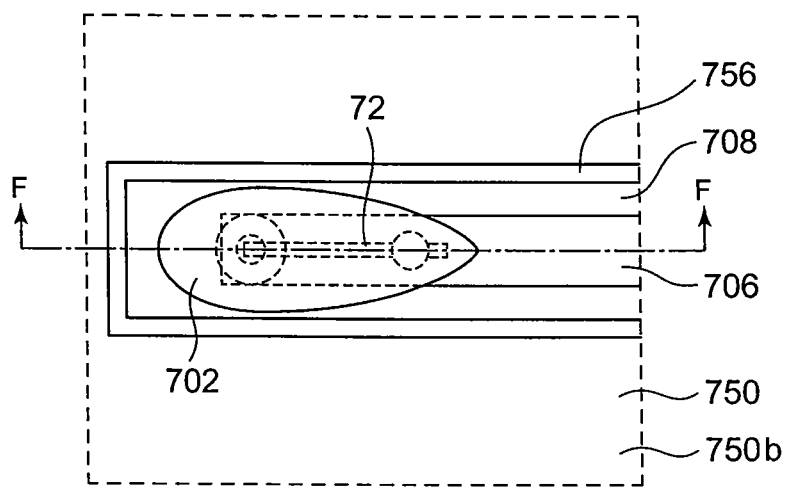
FIG. 6B is a partial bottom view of the brushless motor according to the fifth embodiment of the present invention.

FIG. 6A is a partial cross-sectional view of the brushless motor 700 according to the fifth embodiment. FIG. 6B is a partial bottom view of the brushless motor 700 according to the fifth embodiment. FIG. 6A is a partial cross-sectional view of the brushless motor 700 near the hole 754 arranged on the base plate 750. FIG. 6B is a bottom view near the hole 754 of the base plate 750. FIG. 6A is the view that is sectioned along the line F-F, as illustrated in FIG. 6B.

The description will be omitted with regard to the portion(s) of the brushless motor 700 that is/are not shown in FIG. 6A or FIG. 6B since the portion(s) has/have a structure similar to that/those of the brushless motor 600 according to the fourth embodiment of the present invention.

A concave portion 756 is arranged on the bottom surface 750b of the base plate 750. A driving line 706 and an insulation film 708 are arranged in the concave portion 756. The concave portion 756 is arranged along the arrangement path of the FPC. The depth D of the concave portion 756 is determined so that the resin 702 does not stick out from the bottom surface 750b of the base plate 750. The depth D of the concave portion 756 may be determined by experiment so that the stiffness of the base plate 750 does not decrease below the required level.

The arrangement of the driving line 706 and the insulation film 708 with regard to the hole 754 of the base plate 750 is substantially the same as that in the fourth embodiment. The way of drawing out the wire 72 and the way of applying the resin 702 are also substantially the same as those in the fourth embodiment.

In the brushless motor 700 according to the present embodiment, the thickness of the brushless motor 700 can be reduced.

Above is an explanation based on the exemplary embodiments. These embodiments are intended to be illustrative only, and it will be obvious to those skilled in the art that various modifications to constituting elements and processes could be developed and that such modifications are also within the scope of the present invention.

For example, the concave portion in which a driving line is arranged may be arranged on the bottom surface of the base plate in any one of the first to third embodiments.

Figure 7:
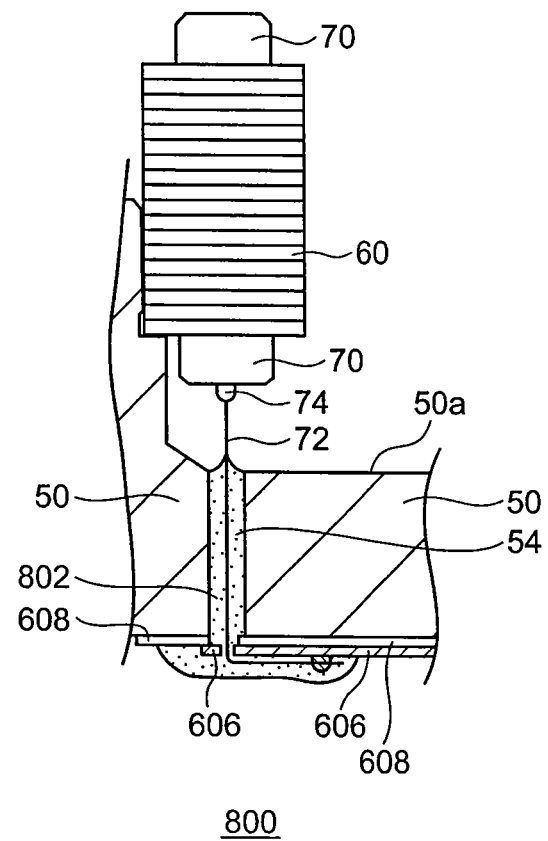
FIG. 7 is a partial cross-sectional view of the brushless motor, in particular near the hole arranged on the base plate, according to the variation.

In any one of the first to fifth embodiments, the hole of the base plate may be plugged with the resin so that the resin sticks out from the hole of the base plate on the upper surface of the base plate. To illustrate this, a variation of the brushless motor 600 according to the fourth embodiment is described below. FIG. 7 is a partial cross-sectional view of the brushless motor 800, in particular near the hole 54 arranged on the base plate 50, according to the variation. As shown in FIG. 7, the hole 54 of the base plate 50 is plugged with the resin 802 so that the resin 802 sticks out from the hole 54 of the base plate 50 on the upper surface 50a of the base plate 50.

Among the processes of manufacturing brushless motors, there is a process in which a brushless motor is cleaned by ultrasonic cleaning after the resin that has been injected into the hole of the base plate has been cured. In this process, if the freely-moving section of the wire of said end of the coil is long, the section may resonate with (vibrate in synch with) the ultrasonic wave and may be cut. In the brushless motor according to this variation, the freely-moving section of the wire of said end of the coil can be made shorter than in the case of the first to fifth embodiments. Therefore, it is less likely that the wire is cut as described above. In addition, since the power of the ultrasonic wave can be increased in the ultrasonic cleaning, the brushless motor can be cleaned more efficiently.

In the description of the first to fifth embodiments of the present invention, the focus is on the wire at the end of winding coils. However, the present invention is not limited to this. For example, in the case where it is necessary to draw out the wires at both the end and the beginning of winding coils to the bottom surface of the base plate, the technical aspect described in the first to fifth embodiments can be applied to the wire at the beginning of the winding coils.

In any one of the first to fifth embodiments, the wire of one end of the coil may be spot welded to the driving line. In this case, since the welded connection can be made smaller, the size of the driving line, particularly its width, can be reduced. As a result, the brushless motor can be further miniaturized.

According to experiments performed by the present inventors, it is confirmed that the welded portion could be made sufficiently small by applying a current of 500-1000 A during a period of time of 20-80 µs, in the case where the diameter of the wire of said end of the coil is 0.23 mm.

The first to fifth embodiments of the present invention describe the case where the wire of one end of the coil is welded to the driving line. However, the present invention is not limited to this. For example, the wire of one end of the coil may be connected to the driving line by any connection means. The connection may be performed by soldering.

The first to fifth embodiments of the present invention describe the case where the brushless motor comprises the FPC. However, the present invention is not limited to this. For example, the driving line of the FPC may be a strip-shaped (or ribbon-shaped or foil-shaped) wiring. The insulation film of the FPC may be a strip-shaped (or ribbon-shaped or foil-shaped) insulator. In the case where the insulator is formed including polyimide in particular, the heat resistance of the insulator may increase and the deformation due to heat generated when the wire of one end of the coil is welded to the driving line may be reduced.

The first to fifth embodiments of the present invention describe the so-called outer-rotor type of brushless motor in which the magnet is located outside the laminated core. However, the present invention is not limited to this. For example, the present invention may be applied to the so-called inner-rotor type of brushless motor in which the magnet is located inside the laminated core.

The first to fifth embodiments of the present invention describe the case where the sleeve is fixed to the base plate and the shaft rotates with respect to the sleeve. However, the present invention is not limited to this. For example, the present invention may be applied to a shaft-fixed type of brushless motor in which the shaft is fixed to the base plate and the sleeve and the hub rotate together with respect to the shaft.

The first to fifth embodiments describe the case where a laminated core is used. However, the present invention is not limited to this. The core does not have to be a laminated core.

While the preferred embodiments of the present invention have been described using specific terms, such description is for illustrative purposes only, and it is to be understood that changes and variations may be made without departing from the spirit or scope of the appended claims.

What is claimed is:

1. A disk drive device, comprising:
a hub on which a recording disk is to be mounted;
a base rotatably supporting the hub on one surface of the base through a bearing unit;
a core fixed on said one surface of the base, the core having a ring portion and a plurality of teeth that extend radially from the ring portion;
coils wound around the plurality of teeth; and
a flexible printed circuit that includes a driving line for supplying a current to the coils,
wherein a wire of one end of one of the coils is drawn out to the other surface of the base through a hole arranged on the base, and
wherein one end of the flexible printed circuit to which end the wire is connected is located at a predetermined distance away from the edge of the hole arranged on the base, and
wherein a concave portion is arranged on the other surface of the base, and
wherein the driving line is arranged in the concave portion, and
wherein the wire is bent above the hole arranged on the base, and
wherein the wire is connected to the driving line at a position other than the position of the hole arranged on the base, and
wherein the hole arranged on the base is plugged with a resin, and wherein, with regard to a portion of the other surface of the base which is between the edge of the hole arranged on the base and the one end of the flexible printed circuit, a section of the wire which is on said portion of the other surface of the base is contained in the resin.

2. The disk drive device according to claim 1, wherein the resin with which the hole arranged on the base is plugged is applied so that the resin covers the connection between the driving line and the wire of said end of said coil.

3. The disk drive device according to claim 1, wherein a middle section of the wire between the hole arranged on the base and said coil is glued onto the core.

4. The disk drive device according to claim 1, further comprising a supporting member arranged to support the wire of said end of said coil with respect to the surface of the hole arranged on the base by intervening between the wire and the surface of the hole,
wherein the supporting member sticks out, along the wire, from the hole arranged on the base on said one surface of the base.

5. The disk drive device according to claim 1, wherein the flexible printed circuit further includes an insulator arranged to insulate the driving line against the other surface of the base, and
wherein the insulator includes polyimide.

6. The disk drive device according to claim 1, wherein the base that includes an alloy of aluminum is formed, and wherein a film for insulation is formed on a surface of the base.

7. The disk drive device according to claim 1, wherein, with regard to wires, both the hole arranged on the base and the concave portion only accommodate the wire of said end of said coil.

8. A disk drive device, comprising:
a hub on which a recording disk is to be mounted;
a base rotatably supporting the hub on one surface of the base through a bearing unit;
a core fixed on said one surface of the base, the core having a ring portion and a plurality of teeth that extend radially from the ring portion;
coils wound around the plurality of teeth; and
a flexible printed circuit that includes a driving line for supplying a current to the coils, wherein a wire of one end of one of the coils is drawn out to the other surface of the base through a hole arranged on the base, and wherein one end of the flexible printed circuit to which end the wire is connected is located at a predetermined distance away from the edge of the hole arranged on the base, and wherein the wire is bent above the hole arranged on the base, and wherein the wire is connected to the driving line at a position other than the position of the hole arranged on the base, and wherein the hole arranged on the base is plugged with a resin, and wherein, with regard to a portion of the other surface of the base which is between the edge of the hole arranged on the base and the one end of the flexible printed circuit, a section of the wire which is on said portion of the other surface of the base is contained in the resin, the disk drive device further comprises a supporting member arranged to support the wire of said end of said coil with respect to the surface of the hole arranged on the base by intervening between the wire and the surface of the hole, wherein the supporting member sticks out, along the wire, from the hole arranged on the base on said one surface of the base.

9. The disk drive device according to claim 8, wherein the resin with which the hole arranged on the base is plugged is applied so that the resin covers the connection between the driving line and the wire of said end of said coil.

10. The disk drive device according to claim 8, wherein a middle section of the wire between the hole arranged on the base and said coil is glued onto the core.

11. The disk drive device according to claim 8, wherein the flexible printed circuit further includes an insulator arranged to insulate the driving line against the other surface of the base, and wherein the insulator includes polyimide.

12. The disk drive device according to claim 8, wherein the base that includes an alloy of aluminum is formed, and wherein a film for insulation is formed on a surface of the base.

13. A disk drive device, comprising:
a hub on which a recording disk is to be mounted;
a base rotatably supporting the hub on one surface of the base through a bearing unit;
a core fixed on said one surface of the base, the core having a ring portion and a plurality of teeth that extend radially from the ring portion;
coils wound around the plurality of teeth; and
a magnet fixed to the hub, the magnet being magnetized for driving with a plurality of poles along the circumferential direction and arranged to radially face the plurality of teeth, wherein a flexible printed circuit that includes a driving line for supplying a current to the coils and a strip-shaped insulator is provided on the other surface of the base, and wherein a wire of one end of one of the coils is drawn out to the other surface of the base through a hole arranged on the base, and wherein the wire is insulated against the other surface of the base by the strip-shaped insulator, and wherein the wire is connected to the driving line at a position other than the position of the hole arranged on the base, and wherein the hole arranged on the base is plugged with a resin.

14. The disk drive device according to claim 13, wherein the strip-shaped insulator is located at a predetermined distance away from the edge of the hole arranged on the base.

15. The disk drive device according to claim 13, wherein an edge of one end of the strip-shaped insulator is arranged to overlap with the hole arranged on the base so that the hole arranged on the base is partly covered by the one end of the strip-shaped insulator and that the wire of said end of said coil is drawn out to the other surface of the base through a portion of the hole arranged on the base which is not covered by the one end of the strip-shaped insulator, and wherein, with regard to an edge of the hole arranged on the base on a side of the other surface of the base, the strip-shaped insulator covers a portion of the edge of the hole, the portion being on the side of the connection between the driving line and the wire of said end of said coil.

16. The disk drive device according to claim 13, wherein the resin with which the hole arranged on the base is plugged is applied so that the resin covers the connection between the driving line and the wire of said end of said coil.

17. The disk drive device according to claim 13, wherein a middle section of the wire between the hole arranged on the base and said coil is glued onto the core.

18. The disk drive device according to claim 13, further comprising a supporting member arranged to support the wire of said end of said coil with respect to the surface of the hole arranged on the base by intervening between the wire and the surface of the hole, wherein the supporting member sticks out, along the wire, from the hole arranged on the base on said one surface of the base.

19. The disk drive device according to claim 13, wherein a concave portion is arranged on the other surface of the base along an arrangement path of the flexible printed circuit, and wherein the driving line is arranged in the concave portion.

20. The disk drive device according to claim 19, wherein, with regard to wires, both the hole arranged on the base and the concave portion only accommodate the wire of said end of said coil.

* * * * *